United States Patent
Yao et al.

(10) Patent No.: US 8,230,237 B2
(45) Date of Patent: Jul. 24, 2012

(54) PRE-BOOT ENVIRONMENT POWER MANAGEMENT

(75) Inventors: Jiewen Yao, Shanghai (CN); Hua Shao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1264 days.

(21) Appl. No.: 11/951,396

(22) Filed: Dec. 6, 2007

(65) Prior Publication Data

US 2009/0150660 A1  Jun. 11, 2009

(51) Int. Cl.
*G06F 1/26* (2006.01)
(52) U.S. Cl. .......................... 713/300; 713/2
(58) Field of Classification Search ............ 713/300, 713/2, 320; 719/314
See application file for complete search history.

(56) References Cited

U.S. PATENT DOCUMENTS

| | | | |
|---|---|---|---|
| 7,117,114 B2 * | 10/2006 | Arabi et al. | 702/132 |
| 7,194,641 B2 * | 3/2007 | Hack | 713/300 |
| 7,543,167 B2 * | 6/2009 | Nakano | 713/320 |
| 7,765,393 B1 * | 7/2010 | Lee et al. | 713/2 |
| 2003/0005026 A1 | 1/2003 | Bower, III | |
| 2003/0070115 A1 * | 4/2003 | Nguyen et al. | 714/23 |
| 2004/0267708 A1 * | 12/2004 | Rothman et al. | 707/3 |

OTHER PUBLICATIONS

Advanced Configuration and Power Interface. 7 pages. Website last modified Oct. 12, 2007. http://en.wikipedia.org/wiki/Advanced_Configuration_and_Powerinterface.
Extensible Firmware Interface. 6 pages. Website last modified Sep. 29, 2007. http://en.wikipedia.org/wiki/Extensible_Firmware_Interface.

* cited by examiner

*Primary Examiner* — Albert Wang
(74) *Attorney, Agent, or Firm* — Trop, Pruner & Hu, P.C.

(57) ABSTRACT

A pre-boot environment is disclosed that manages power of a computing device prior to an operating system runtime phase. The pre-boot environment may be implemented in a computing device having a storage device to store an operating system, a firmware device to store firmware having a boot loader to load and initiate execution of the operating system, and a processor to execute the firmware and the operating system. The firmware in response to being executed by the processor may result in the computing device monitoring operating conditions of the computing device, and initiating a power management response based upon the operating conditions of the computing device and a power management policy.

21 Claims, 4 Drawing Sheets

PRE-BOOT ENVIRONMENT POWER MANAGEMENT

BACKGROUND

The *UEFI Specification version* 2.1, published Jan. 23, 2007 specifies a Unified Extensible Firmware Interface (UEFI) that provides a software interface between an operating system (OS) and platform firmware of a computing device. The interface defined by the UEFI specification includes data tables which contain platform information, and boot and runtime services which are available to the operating system (OS) loader and the operating system. The UEFI defines boot services, which include text and graphical console support on various devices, bus, block and file services, and runtime services, such as date, time and NVRAM services.

The UEFI may also provide UEFI applications. Rather than booting directly into a full operating system, on some implementations, the user may boot to a UEFI shell and/or another UEFI application. The computing device may execute the UEFI shell and other UEFI applications from a platform firmware device such as, for example, Read-Only Memory (ROM), FLASH memory, battery backed memory, and/or other non-volatile memory device. The computing device may also execute the UEFI shell and other UEFI applications from other devices such as, for example, a hard disk drive, CD-ROM drive, and/or network controller for which the drivers are supplied by the platform firmware device. The shell may be used to execute other UEFI applications, such as setup, OS install, diagnostic or configuration utilities, and system flash updates. The shell and/or other UEFI applications may also be used to play CDs or DVDs without booting an operating system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
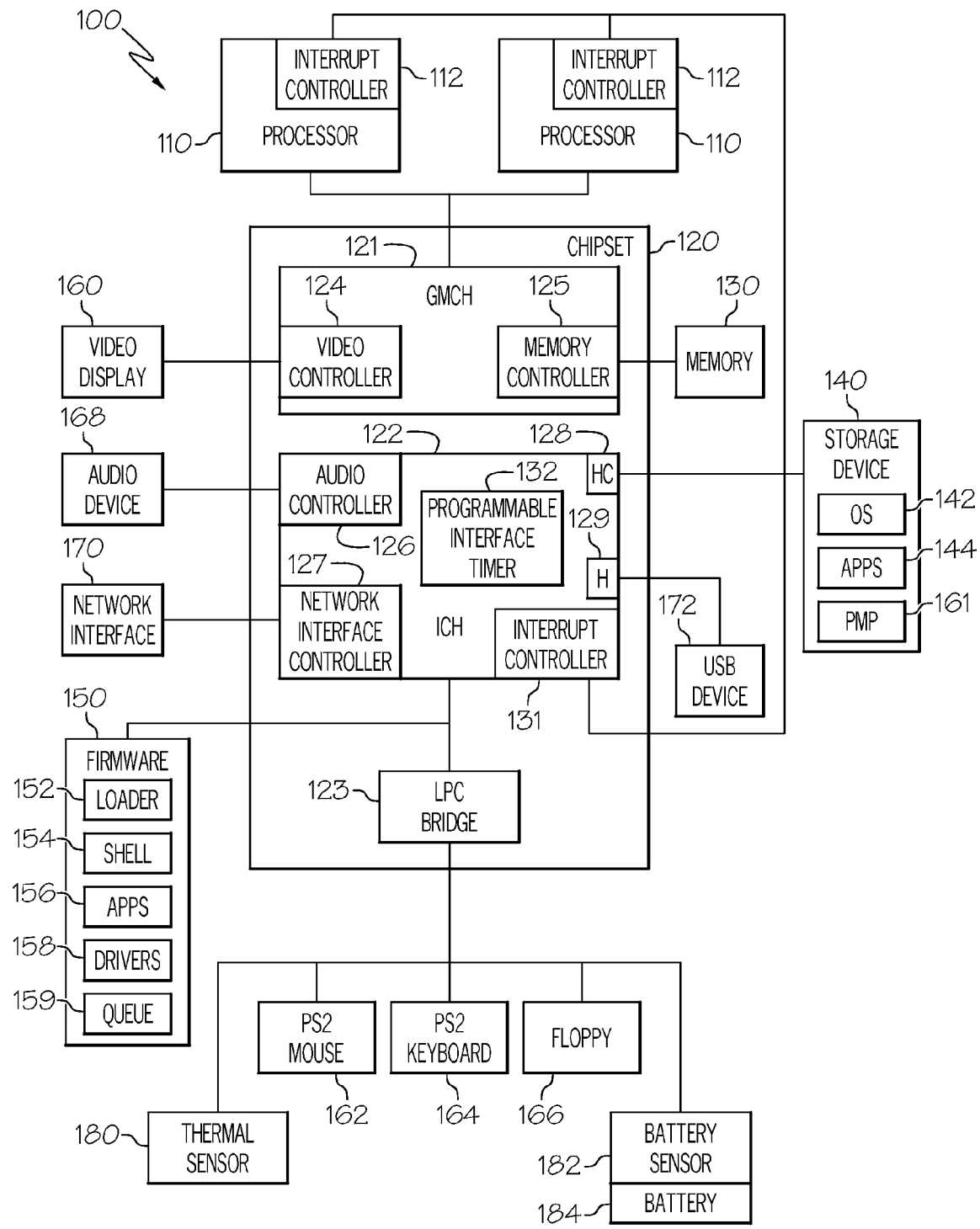
FIG. 1 shows an embodiment of a computing device having a platform firmware device that defines a pre-boot environment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, an embodiment of a computing device 100 such as, for example, a desktop computer system, laptop computer system, a server computer system, or handheld device is shown. The computing device 100 may include one or more processors 110, a chipset 120, system memory 130, a storage device 140, and platform firmware device 150. It should be noted that while the computing device 100 is depicted in FIG. 1 with two processors 110, other embodiments of the computing device 100 may have a single processor 110 or more than two processors 110. The processors 110 may perform tasks in response to executing software instructions of the storage device 140 and/or firmware instructions of the platform firmware device 150. In particular, the processor 110 may include one or more processing cores to execute a boot loader 152, a firmware shell 154, firmware application 156, firmware device drivers 158, and/or an event queue 159 of the platform firmware device 150. The processor 110 may further execute software instructions of an operating system 142 and/or applications 144 of the storage device 140.

As shown, the chipset 120 may include a graphical memory controller hub (GMCH) 121, an input/output controller hub (ICH) 122, and low pin count (LPC) bus bridge 123. The LPC bus bridge may connect a mouse 162, keyboard 164, floppy disk drive 166, and other low bandwidth devices to an LPC bus used to couple the platform firmware device 150 to the ICH. The graphical memory controller hub 121 may include a video controller 124 to control a video display 160 and a memory controller 125 to control reading from and writing to system memory 130. The system memory 130 may store instructions to be executed by the processors 110 and/or data to be processed by the processors 110. To this end, the system memory 130 may include dynamic random access memory devices (DRAM), synchronous DRAM (SDRAM), double-data rate (DDR) SDRAM, and/or other volatile memory devices.

The ICH 122 may include an audio controller 126 to drive audio output devices 168 such as, for example, speakers and a network interface controller 127 to control a network interface 170 such as, for example, an Ethernet interface. The ICH 122 may further include a hard disk controller 128 to control a storage device 140 such as an ATA (Advanced Technology Attachment) hard disk drive, a Universal Serial Bus (USB) controller 129 to control one or more USB devices 172 such as, for example, a keyboard, mouse, hard drive, thumb drive, floppy drive, scanner, and/or printer to name a few.

As shown, the ICH 122 may also include an interrupt controller 131 to send hardware interrupt signals to a local interrupt controller 112 of the processors 110. The local interrupt controllers 112 may comprise for example, an advanced programmable interrupt controller (APIC) found in some Intel® microprocessors. The local interrupt controller 112 of the processors may receive hardware interrupt signals from a programmable interrupt controller 131 of the chipset 120 in response to requests for service from storage device 140, video display 160, mouse 162, keyboard 164, floppy disk drive 166, audio output device 168, network interface 170, universal serial bus (USB) device 172, or another hardware device. Such hardware interrupt signals may result in the processor 110 interrupting an active thread of execution in order to execute an interrupt service routine to service the received hardware interrupt signal.

The ICH 122 may also include a programmable interrupt timer 132 to generate timer interrupts. The timer 132 may include an Intel® 8254 programmable interrupt timer; however, other programmable interrupt timers are also possible. As explained in more detail below, the processors 110 may interrupt execution of an active thread of the firmware in response to expiration of a trigger time of an event registered with an event queue 159 of the firmware. Execution of firmware of the firmware device 150 may program the timer 132 to drive the event queue 159. In particular, the timer 132 may generate timer interrupts that cause the processors 110 to interrupt execution of an active thread and determine whether trigger times associated with events registered to the event queue 159 have expired.

As shown, the platform firmware device 150 may include firmware which defines an operating system (OS) boot loader 152, a firmware shell 154, a firmware application 156, firmware device drivers 158, and an event queue 159. The processors 110 execute the OS boot loader 152 upon system startup in order to load the operating system 142 from the storage device 140 and initiate execution of the loaded operating system 142. The computing device 100 may further permit a user to forego or delay executing the boot loader 152 and instead enter a pre-boot environment.

The term pre-boot phase is commonly used to refer to the time between starting up the computing device 100 and initiating execution of the boot loader 152. Furthermore, the term OS runtime phase is often used to refer to the period following the start of execution of the boot loader 152. The firmware shell 154, applications 156, drivers 158, and event queue 159 in one embodiment provide a pre-boot environment during the pre-boot phase of the computing device. In one embodiment, the firmware of the platform firmware device 150 is implemented in accordance with the UEFI Specification version 2.1, published Jan. 23, 2007. The UEFI Specification version 2.1 specifies a Unified Extensible Firmware Interface (UEFI) that provides a software interface between the operating system 142 and platform firmware of a computing device 100. In particular, the firmware shell 154 may provide the pre-boot environment with a command prompt via which a user may execute low level commands in order to manage the computing device 100. The firmware shell 153 may further enable a user to execute high-level firmware applications 156 to perform other tasks. In one embodiment, the firmware applications 156 may provide setup applications, OS install applications, diagnostic or configuration utilities, and system flash updates. Moreover, the firmware applications 156 may also support playing CDs or DVDs without booting an operating system 142.

The pre-boot environment provided by the firmware of the platform firmware device 150 further includes device drivers 158. Device drivers 158 provide routines for monitoring, controlling, and/or accessing devices of the computing device 100. For example, the pre-boot environment may include device drivers 158 for reading and writing to storage device 140 per one or more file system formats. The pre-boot environment may also include device drivers 158 for receiving user input via mouse 162 and keyboard 164 and for displaying information via video display 160.

Unlike the hardware interrupt driven device drivers of the operating system 142, the device drivers 158 of the pre-boot environment are not hardware interrupt driven. Instead, the device drivers 158 periodic poll their respective devices since hardware interrupts are disabled in the pre-boot environment. To aid the device drivers 158, the pre-boot environment of the firmware device 150 further provides an event queue 159 to which the device drivers 158 as well as other modules of the firmware may register events. In one embodiment, the event queue 159 is implemented in accordance with the task priority service of the UEFI Specification version 2.1. In particular, the event queue 159 may support events of different task priority levels (TPL) such as, for example, a high TPL event, medium TPL event, or low TPL event, thus providing higher priority to the execution of some tasks in relation to other tasks. Moreover, the modules may associate, with each registered event, a trigger time and device driver 158 to handle the event. The event queue 159 may then determine based upon timer interrupts generated by the programmable interrupt timer 132 whether the trigger time associated with a registered event has expired. In response to expiration of the associated trigger time, the event queue 159 may cause the processors 110 to execute a driver 158 associated with the registered event.

The computing device 100 may also include one or more thermal sensors 180. The thermal sensors 180 may generate temperature signals representative of a temperature of a respective device of the computing device 100. For example, the computing device 100 may include thermal sensors 180 that generate temperature signals indicative of the temperature of a processor 110, memory 140, memory controller 125, video controller 124, battery 184, or other component of the computing device.

As shown, the computing device 100 may also include a battery sensor 182 and a battery 184. The battery 184 may power components of the computing device 100. In particular, the battery 184 may power components in response to a power supply of the computing device 100 not being connected to a source of external electrical power such as, for example, a wall power outlet. The battery sensor 182 may generate one or more signals indicative of the battery status. For example, the signals may indicate the charge level of the battery 184 and whether the battery 184 is reaching a critically low level.

Figure 2:
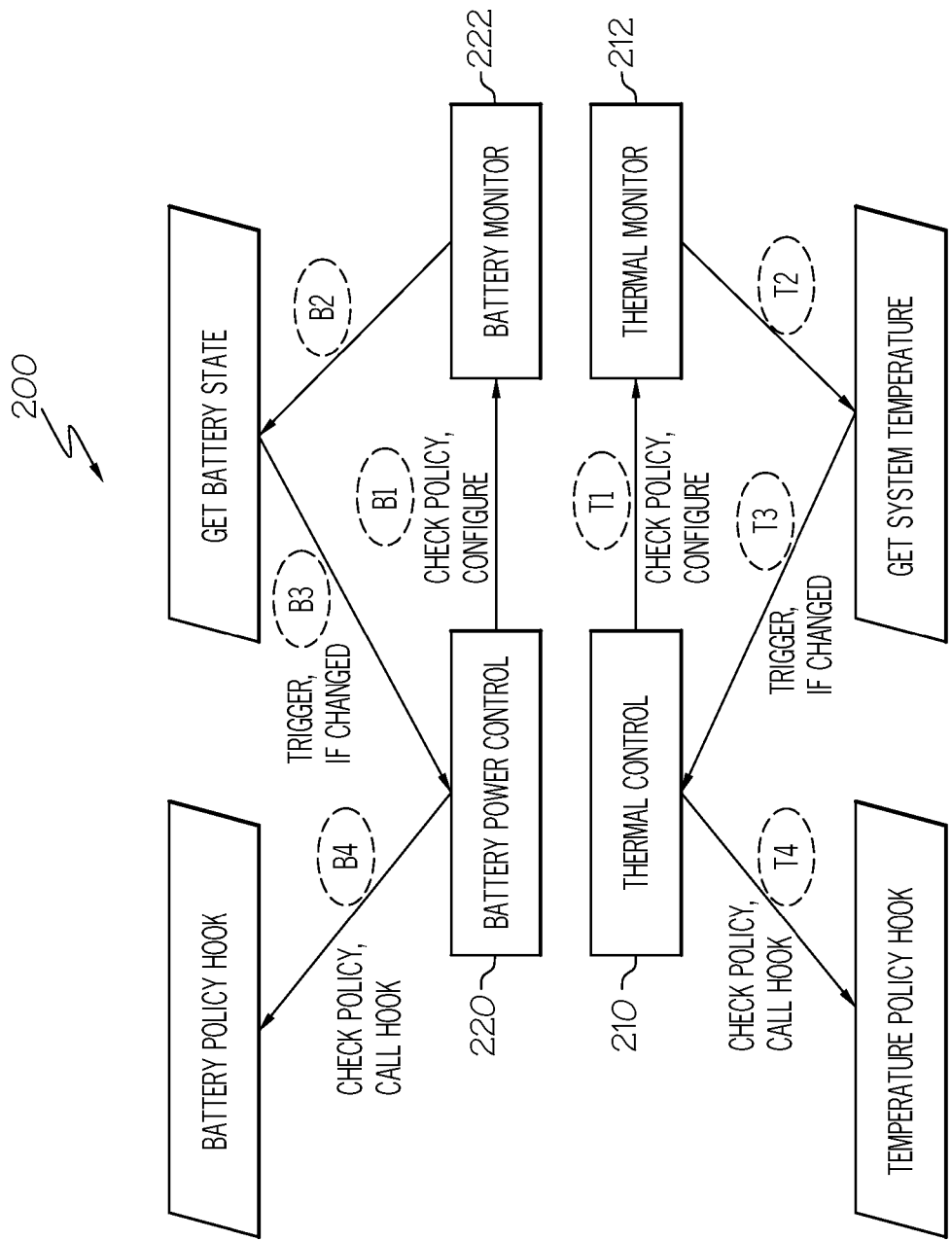
FIG. 2 shows operation of an embodiment of the system monitor of the pre-boot environment.

Referring now to FIG. 2 operation of an embodiment of a system monitor of the pre-boot environment is shown. The system monitor may be implemented as a device driver 158 of the pre-boot environment that monitors the temperature of one or more components of the computing device 100. To this end, the system monitor may register a thermal control event having an associated event trigger time with the event queue 159. The thermal control event may trigger execution of a thermal control 210 of the system monitor after expiration of the event trigger time. The system monitor may also register the thermal control event as a high TPL event with the event queue 159 to ensure thermal control event is processed prior to other lower level tasks.

In response to expiration of the thermal control event, the thermal control 210 at T1 may register a thermal monitor event based upon a user defined power management policy 161 and a temperature signal generated by a temperature sensor 180 of the computing device 100. In particular, the thermal control 210 may register the thermal monitor event as a high TPL event with the event queue 159 to ensure the thermal monitor event is processed prior to other lower level tasks.

As shown, the power management policy 161 may be stored by the storage device 160. However, the power management policy 161 may be stored elsewhere such as the firmware device 150 and/or other non-volatile storage of the computing device 100. In one embodiment, the user may define an active cooling threshold, a passive cooling threshold, and a critical cooling threshold. For example, the user may set 65 C as the active cooling threshold, 70 C as the passive cooling threshold, and 90 C as the critical cooling threshold. Thus, based upon the current temperature and the power management policy the thermal control 210 may adjust the execution frequency of the thermal monitor event. For example, the thermal control may reduce the execution frequency of the thermal monitor control event in response to the temperature being below the active cooling threshold, but may increase the execution frequency of the thermal monitor control event in response to the temperature being above the active cooling threshold, or the passive cooling threshold.

In response to expiration of the trigger time of the thermal monitor event, the thermal monitor 212 of the system monitor may obtain the system temperature of the computing device 100 at T2. In particular, the thermal monitor 212 may obtain the system temperature based upon one or more temperature signals of the temperature sensors 180. The thermal monitor 212 may then determine whether the temperature has changed since the last thermal monitor 212 obtained a temperature reading. If the temperature reading as changed, then the thermal monitor 212 may trigger an thermal control event at T3 to report the temperature change to the thermal control 210. The thermal control 210 may determine whether the thermal monitor 212 triggered the thermal event in order to report a temperature change. In response to determining that the thermal monitor 212 triggered the thermal control event, the thermal control 210 at T4 may check the power management policy and invoke a proper power management response to the changed temperature. For example, the system may put processor 110 to lower C-state more frequently, or the system may put processor 110 to lower P-state, or T-state. The thermal monitor 212 may also reconfigure the thermal monitor event at T1 based upon the new temperature reading.

The thermal monitor 212 at T4 may invoke several different types of power management responses in order to cool the computing device 100. For example, if the active cooling threshold is exceeded, the thermal control 210 may initiate an active cooling response such as, for example, turning on and/or increasing the speed of fans of the computing device 100. Further, if the passive cooling threshold is exceeded, the thermal control 210 may initiate a passive cooling response such as, for example, throttling processors 110 and/or memory 130. Further, if the critical thermal threshold is exceeded, the thermal control 210 may initiate a critical cooling response such as, for example, forcing the computing device 100 to enter a sleep state or shutting down the computing device 100.

The system monitor may further include a battery power control 220 and a battery monitor 22 that monitor the state of the system battery 184. To this end, the system monitor may register a battery power control event having an associated event trigger time with the event queue 159. The battery power control event may trigger execution of the battery power control 220 of the system monitor after expiration of the event trigger time. The system monitor may also register the battery power control event as a high TPL event with the event queue 159 to ensure the batter power control event is processed prior to other lower level tasks.

In response to expiration of the battery power control event, the thermal control 210 at B1 may configure a battery monitor event based upon a user defined power management policy 161 and a battery status signal generated by a battery sensor 182 of the computing device 100.

In response to expiration of the trigger time of the battery monitor event, the battery monitor 222 of the system monitor may obtain the battery status of the battery 184 at B2. In particular, the battery monitor 222 may obtain the batter status based upon the battery sensor 182. The battery monitor 222 may then determine whether the battery status has changed since the last time the battery monitor 222 obtained a battery reading. If the battery status as changed, then the battery monitor 222 may trigger an battery power control event at B3 to report the battery status change to the battery control 220. The battery control 220 may determine whether the battery monitor 222 triggered the thermal event in order to report a battery status change. In response to determining that the battery monitor 222 triggered the battery power control event, the battery control 220 at B4 may check the power management policy and invoke a proper power management response to the changed battery status. The battery monitor 22 may also reconfigure the battery monitor event at B1 based upon the new battery status.

As mentioned above, the battery power control 220 may invoke a power management response based upon the power management policy 161. For example, the user may define a warning battery level, a low battery level, and a critical battery level. Moreover, the user may define power management strategies for each of the battery levels. For example, the user may instruct the battery power control 220 via the power management policy 161 to place certain system components (e.g. processor 110) in a low power state in response to reaching the warning battery level, to place certain system components into even a lower power state (such as lower P-state) in response to reaching the low battery level, or to place the system into deep sleep (such as S3, S4 state) or a power down state in response to reaching the critical battery level.

Figure 3:
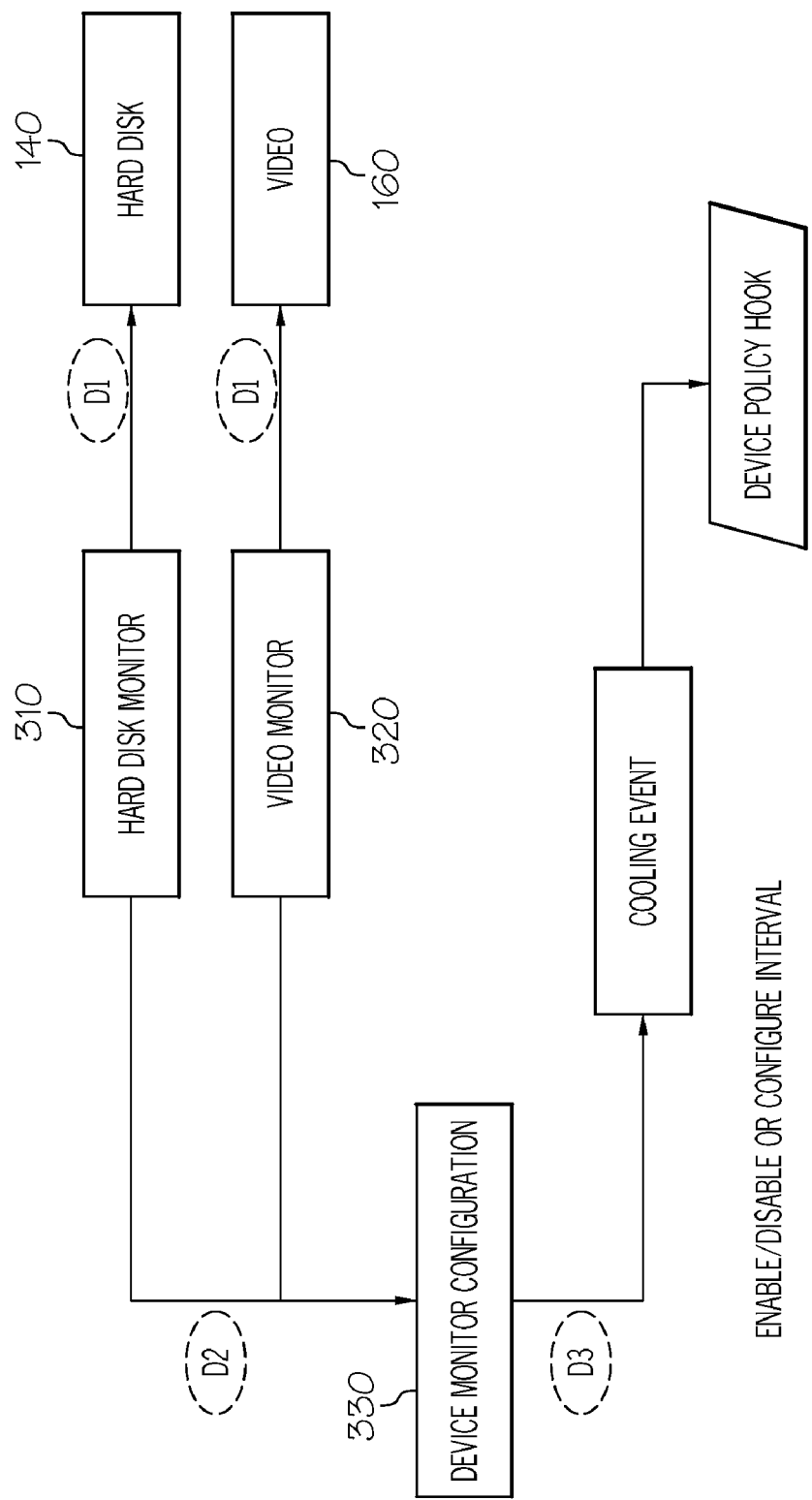
FIG. 3 shows operation of an embodiment of a device monitor of the pre-boot environment.

Referring now to FIG. 3 operation of an embodiment of a device monitor of the pre-boot environment is shown. The device monitor may be implemented as a device driver 158 of the pre-boot environment that monitors system device usage such as, for example, hard-disk 140 and video 160 and any other possible devices which has power state support, such USB 172 and controls power management based upon device usage. To this end, the device monitor may register a hard disk monitor event and a video monitor event each having an associated event trigger time with the event queue 159. The hard disk monitor event may trigger execution of a hard disk monitor 310 of the device monitor after expiration of the event trigger time. Similarly, the video monitor event may trigger execution of a video monitor 320 of the device monitor after expiration of the event trigger time. The device monitor may register the hard disk monitor event and the video monitor event as a medium TPL events with the event queue 159 to ensure hard disk monitor event and the video monitor event are processed prior to other lower level tasks. The device monitor may further register a high TPL event for a device monitor configuration 330.

In response to expiration of their associated events, the hard disk monitor 310 and video monitor 320 as shown at D1 may respectively determine the status of the hard disk 140 and the video display 160 in order to determine whether each is in a "busy" state or an "idle" state based upon usage statistics reported by the devices. Furthermore, in response to determining that the respective device is "busy", the hard disk monitor 310 and video monitor 320 at D2 may trigger an device monitor configuration event in order to report the busy status to the device monitor configuration 330. In response to the device monitor configuration event, the device monitor configuration 330 may determine a power management response based upon the device states received from the system device monitors 310, 320. For example, the device monitor configuration 330 may disable a cooling event at D3 that is configured to place the device into a lower device power state (such as D3 state) after a specified period (e.g. 10 minutes) of idleness if one or more of the system devices 140, 160 has not been busy during the specified period.

Figure 4:
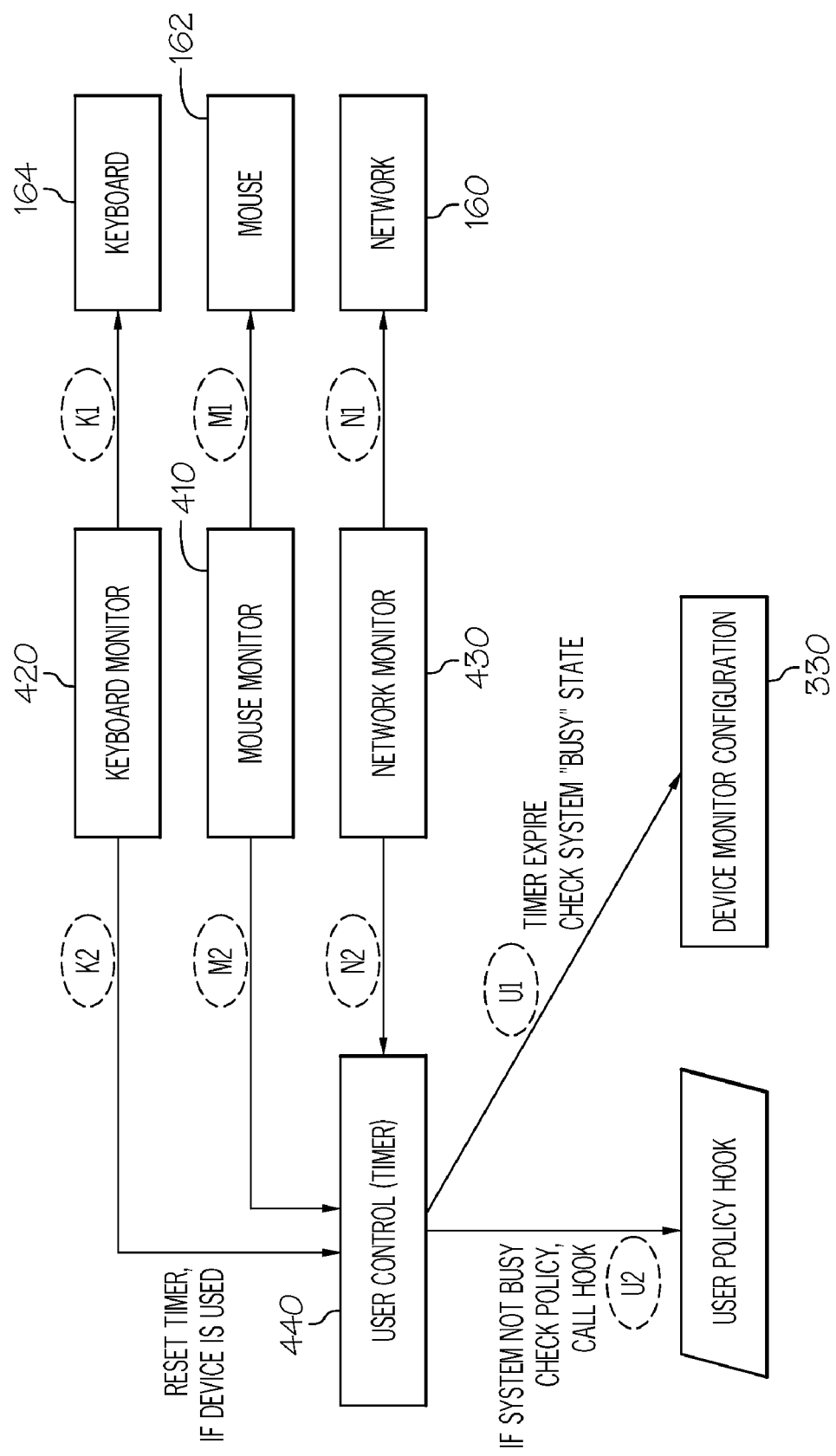
FIG. 4 shows operation of an embodiment of a user monitor of the pre-boot environment.

Referring now to FIG. 4 operation of an embodiment of a user monitor of the pre-boot environment is shown. The user monitor may attempt to determine whether a user of the computing device 100 is still actively using the computing device 100 based upon activity of human interface devices such as mouse 162 and keyboard 164 and activity of the network interface 170 and other terminal devices such as serial terminal. The user monitor may be implemented as a device driver 158 of the pre-boot environment that monitors human interface devices 162, 164 and network devices 170 for activity. To this end, the user monitor may register a mouse monitor event, a keyboard monitor event, and network monitor event each having an associated event trigger time with the event queue 159 to trigger execution of mouse monitor 410, keyboard monitor 420 and network monitor 430. The user monitor may register the mouse monitor event, the keyboard monitor event, and the network monitor event as medium TPL events with the event queue 159 to ensure processing prior to other lower level tasks.

The user monitor may further register a medium TPL event for a user control 440 based upon the power management policy 161. The power management policy may instruct the user control 440 to place the system into a sleep state after a specified period (e.g. 15 minutes) of user inactivity. Accordingly, the user monitor may register the user control event such that event expires and executes the user control 440 after the specified period.

The monitors 410, 420, 430 detect activity on their respective device as shown at M1, K1, and N1. The monitors 410, 420, 430 at M2, K2, and N2 may report such activity to the user control 440 via a user control event. The user control 440 may then determine whether the specified period has expired. In response to determining that the specified period has not expired, the user control 440 may request the device monitor configuration 330 for the state of the system at U1. If the device monitor configuration 330 reports to the user control 440 that the system is idle, then the user control 440 at U2 may invoke a power management response per the power management policy 161 such as placing the computing device in low power state (such as D3 state), or computer system in a suspend mode (S1 or S3 state), hibernation mode (S4 state), or other sleep mode.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A non-transitory machine readable medium comprising a plurality of instructions that, in response to being executed, result in a computing device:
    determining within a pre-boot environment whether to initiate an action to modify a power usage of the computing device during the pre-boot environment; and
    registering an event having an associated event trigger time with the pre-boot environment.

2. The machine readable medium of claim 1, wherein
    registering comprises registering a thermal monitor event with the pre-boot environment, and
    determining comprises determining to initiate the action to modify the power usage of the computing device based upon a temperature of the computing device.

3. The machine readable medium of claim 1, wherein
    registering comprises registering a battery monitor event with the pre-boot environment, and
    determining comprises determining to initiate the action to modify the power usage of the computing device based upon battery status of a battery of the computing device.

4. The machine readable medium of claim 1, wherein
    registering comprises registering a device monitor event with the pre-boot environment, and
    determining comprises determining to place a device in a low power state based upon an activity state of the device.

5. The machine readable medium of claim 1, wherein
    registering comprises registering a user interface monitor event with the pre-boot environment, and
    determining comprises determining to place the computing device into a sleep state based upon an activity state of a user interface device.

6. The machine readable medium of claim 1, wherein the plurality of instructions further result in the computing device adjusting operation of a fan of the computing device in response to determining to initiate the action to modify the power usage of the computing device.

7. The machine readable medium of claim 1, wherein the plurality of instructions further result in the computing device throttling a processor of the computing device in response to determining to initiate the action to modify the power usage of the computing device.

8. The machine readable medium of claim 1, wherein the plurality of instructions further result in the computing device throttling a system memory of the computing device in response to determining to initiate the action to modify the power usage of the computing device.

9. The machine readable medium of claim 1, wherein the plurality of instructions further result in the computing device placing one or more components of the computing device in a low power state in response to determining to initiate the action to modify the power usage of the computing device.

10. The machine readable medium of claim 1, wherein the plurality of instructions further result in the computing device shutting down the computing device in response to determining to initiate the action to modify the power usage of the computing device.

11. The medium of claim 1, further storing instructions to establish a pre-boot environment to manage power of the computing device, the pre-boot environment to operate without assistance from the operating system of the computing device.

12. The medium of claim 1, further storing instructions to determine within the pre-boot environment in response to expiration of the event trigger time whether to initiate the action to modify the power usage of the computing device based upon one or the other of the operating conditions of the computing device or a power management policy of the computing device.

13. A computing device, comprising
   a storage device to store an operating system,
   a firmware device to store firmware having a boot loader to load and initiate execution of the operating system,
   a processor to execute the firmware and the operating system, wherein
   the firmware in response to being executed by the processor results in the computing device,
   monitoring operating conditions of the computing device, and
   initiating an action to modify a power usage of the computing device, before booting the operating system, based upon the operating conditions of the computing device and a power management policy;
   further comprising a battery to supply power to one or more components of the computing device, wherein execution of the firmware further results in the computing device;
   registering, with an event queue managed by the firmware, a battery monitor event having an associated trigger time, and
   in response to expiration of the trigger time associated with the battery monitor event, determining to initiate the action to modify the power usage of the computing device based upon battery status of the battery.

14. The computing device of claim 13, wherein execution of the firmware further results in the computing device
   registering, with an event queue managed by the firmware, a thermal monitor event having an associated trigger time, and
   in response to expiration of the trigger time associated with the thermal monitor event, determining to initiate the action to modify the power usage of the computing device based upon a temperature of the computing device.

15. The computing device of claim 13, wherein execution of the firmware further results in the computing device,
   registering, with an event queue managed by the firmware, a device monitor event having an associated trigger time,
   in response to expiration of the trigger time associated with the device monitor event, determining to initiate the action to modify the power usage of the computing device based upon an activity state of the storage device, and
   placing the storage device in a low power state in response to initiating the action to modify the power usage of the computing device.

16. The computing device of claim 13, further comprising a user interface device, wherein execution of the firmware further results in the computing device,
   registering, with an event queue managed by the firmware, a user interface monitor event having an associated trigger time,
   in response to expiration of the trigger time associated with the user interface monitor event, determining to initiate the action to modify the power usage of the computing device based activity of a user interface device, and
   placing the computing device into a sleep state in response to initiating the action to modify the power usage of the computing device.

17. A method, comprising
   establishing a pre-boot environment to manage power of the computing device, the pre-boot environment to operate without assistance from an operating system of the computing device,
   registering an event having an associated event trigger time with the pre-boot environment, and
   determining with the pre-boot environment in response to expiration of the event trigger time whether to initiate an action to modify a power usage of the computing device in the pre-boot environment based upon operating conditions of the computing device and a power management policy of the computing device.

18. The method of claim 17, wherein
   registering comprises registering a thermal monitor event with the pre-boot environment, and
   determining comprises determining to initiate the action to modify the power usage of the computing device based upon a temperature of the computing device.

19. The method of claim 17, wherein
   registering comprises registering a battery monitor event with the pre-boot environment, and
   determining comprises determining to initiate the action to modify the power usage of the computing device based upon battery status of a battery of the computing device.

20. The method of claim 17, wherein
   registering comprises registering a device monitor event with the pre-boot environment, and
   determining comprises determining to place a device in a low power state based upon an activity state of the device.

21. The method of claim 17, wherein
   registering comprises registering a user interface monitor event with the pre-boot environment, and
   determining comprises determining to place the computing device into a sleep state based upon an activity state of a user interface device.

* * * * *